(No Model.)

W. S. THAYER.
Combined Check Hook and Trace Carrier.

No. 231,941. Patented Sept. 7, 1880.

Witnesses:
Nat. E. Oliphant
Geo. R. Porter

Inventor:
William S. Thayer,
per Chas. H. Fowler,
Attorney.

UNITED STATES PATENT OFFICE.

WILLIAM S. THAYER, OF OWEGO, NEW YORK.

COMBINED CHECK-HOOK AND TRACE-CARRIER.

SPECIFICATION forming part of Letters Patent No. 231,941, dated September 7, 1880.

Application filed July 24, 1880. (No model.)

*To all whom it may concern:*

Be it known that I, WILLIAM S. THAYER, a citizen of the United States, residing at Owego, in the county of Tioga and State of New York, have invented certain new and useful Improvements in Combined Check-Hook and Trace-Carrier; and I do hereby declare that the following is a full, clear, and exact description of the same, reference being had to the annexed drawings, making a part of this specification, and to the letters and figures of reference marked thereon.

Figure 1:
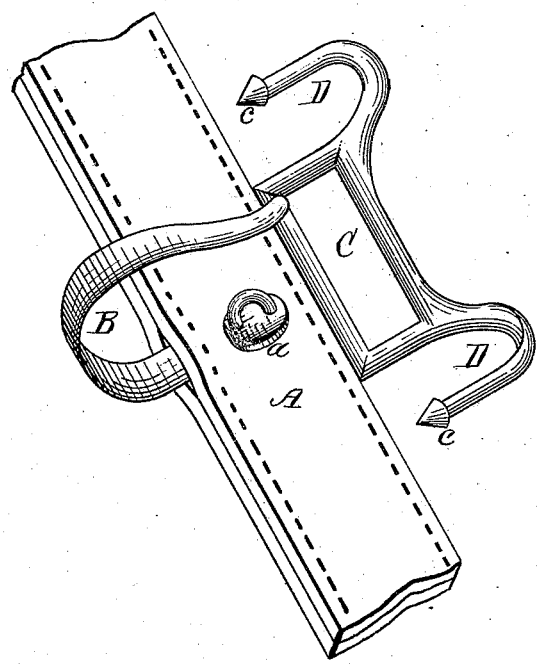
Figure 2:
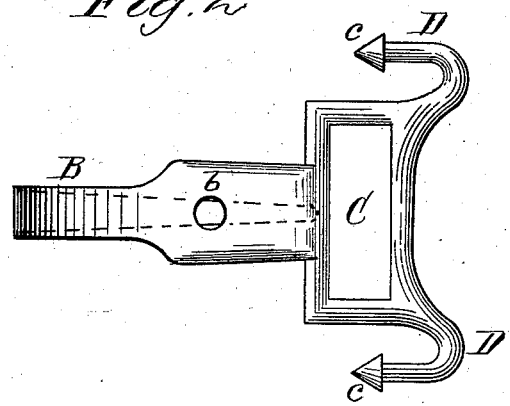

Figure 1 of the drawings is a perspective view of my invention, showing it attached to the back-strap of a harness, and Fig. 2 is an under-side plan view of the same.

The present invention has relation to certain new and useful improvements in devices to be connected to the back-straps of harness, for holding the traces after having been disconnected from the vehicle. The object thereof is to form a simple device having the usual check-hook and back-strap loop, with hooks upon each side thereof for holding and carrying the traces when disconnected from the vehicle, thereby presenting in the market a single article combining the above-mentioned features ready for attaching to the harness.

The invention consists in the device of the form and construction shown in the drawings, and hereinafter described.

In the accompanying drawings, A represents the back-strap of a harness, having connected thereto my improved device consisting of the usual check-hook B, the shank of which is disposed between the two thicknesses of leather forming the strap. A suitable screw-button, a, passes through the strap A and through a hole, b, in the shank of the hook B, to more firmly secure the hook to the strap. Other means, however, may be employed for attaching the hook to the strap, as found most convenient. The hook B has a back-strap loop, C, and upon each side thereof is a hook, D, projecting up at an angle from the loop. These hooks D are for the purpose of holding the traces, the hooks upon the ends thereof being hung over and upon the hooks D, said hooks having knobs c for preventing the traces from being easily pulled off the hooks.

Both the hooks D, loop C, and hook B are formed from one casting, and, if desired, they may be ornamented to suit the taste of the purchaser, and may be nickel or silver plated or composed of brass or other metals, as found preferable.

Having now fully described my invention, what I claim as new, and desire to secure by Letters Patent, is—

As an improved article of manufacture, a combined check-hook and trace-carrier, consisting of the hook B, strap-loop C, and side hooks, D D, adapted to be secured to a back-strap or harness-saddle, all substantially as shown and described.

In testimony that I claim the above I have hereunto subscribed my name in the presence of two witnesses.

WILLIAM S. THAYER.

Witnesses:
GEO. R. HIBBARD,
GEO. CRABB.